United States Patent [19]

Risky

[11] 3,713,103

[45] Jan. 23, 1973

[54] REMOTE CONTACT SENSING SCANPOINT MATRIX

[75] Inventor: Frank A. Risky, Cicero, Ill.

[73] Assignee: GTE Automatic Electric Laboratories Incorporated, Northlake, Ill.

[22] Filed: June 29, 1971

[21] Appl. No.: 158,008

[52] U.S. Cl. .........340/166 R, 179/175.2 C, 317/9 D, 340/256

[51] Int. Cl..............................H02h 3/04, H04q 1/00

[58] Field of Search......340/166, 214, 409, 413, 256; 179/18 GF, 18 AB, 175.2 C

[56] References Cited

UNITED STATES PATENTS 3,571,800 3/1971 Taylor..................................340/166

3,626,248 12/1971 Bartlett...............................340/256 X

*Primary Examiner*—Donald J. Yusko

*Attorney*—Kurt Mullerheim, B. E. Franz, R. F. Van Epps and Theodore C. Jay, Jr.

[57] ABSTRACT

A scanpoint matrix for monitoring the state of remote contacts includes an array of scanpoints arranged in rows and columns. A driver is coupled in parallel to each scanpoint in a row and output means are coupled in parallel to each scanpoint in a column. Each scanpoint is coupled to a remote contact to be monitored and includes a voltage divider and a diode which is reverse biased when the remote contact is open and which acts as a shunt when the remote contact is closed.

10 Claims, 1 Drawing Figure

PATENTED JAN 23 1973 3,713,103
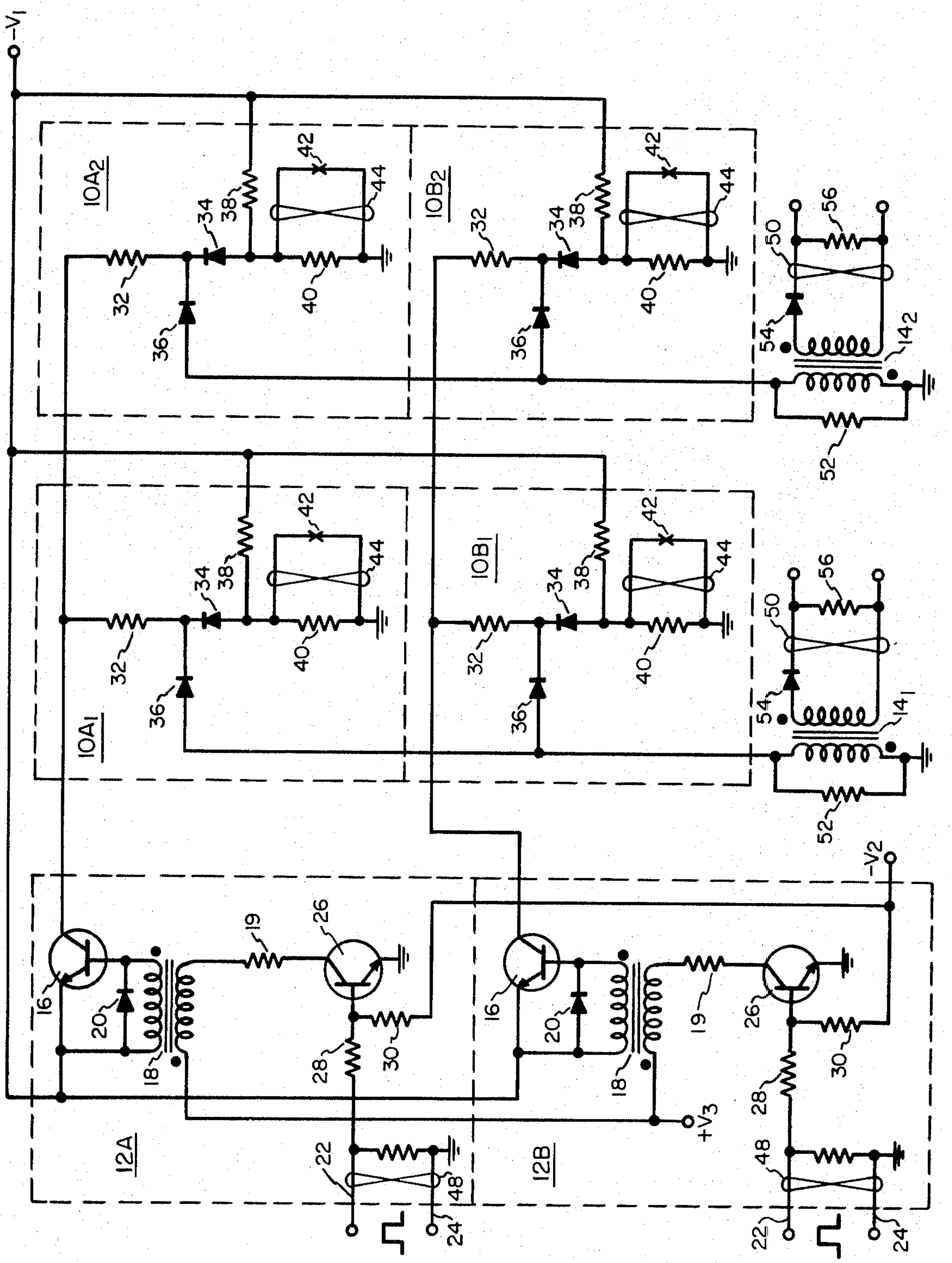
INVENTOR
FRANK A. RISKY
BY
ATTORNEY

REMOTE CONTACT SENSING SCANPOINT MATRIX

BACKGROUND OF THE INVENTION

1. Field of the Invention

The present invention relates generally to the field of electronic scanners and more particularly to a new and novel electronic scanpoint matrix for monitoring the states of a plurality of remote contacts.

2. Description of the Prior Art

In many systems of various types it is necessary that the states of a plurality of signal lines, relay contacts or transistor switches be monitored. A typical application is the telephone system wherein it is necessary to monitor the state of each of a group of trunk relays.

Prior to the present invention the typical solution to this monitoring problem was to couple a saturable magnetic core to the line to be monitored; each core constituting a scanpoint. A scanner of this type using saturable transformer scanpoints is described in U.S. Pat. No. 3,558,828 which issued to Marty et al. on Jan. 26, 1971.

Electromagnetic scanpoints have come into wide use and have proven generally workable; however, significant disadvantages attend their use. First, any scanpoint formed of a core and winding is quite difficult and thus expensive to produce uniformly in the necessary large quantities. Secondly, in the application to telephone line or relay monitoring, the supervised contact is generally separated from the scanpoint matrix element by 100 or more feet of twisted pair cable over which an interrogating pulse must be transmitted. The propagation delays and impedance mismatches which are inherent in pulse transmission over this length of twisted cable have a serious detrimental effect upon the zero (contact closed) to one (contact open) signal ratio.

OBJECTS AND SUMMARY OF THE INVENTION

From the foregoing discussion it will be understood that among the objects of the present invention are included:

the provision of a new and novel electronic scanpoint matrix for monitoring the states of a plurality of remote contacts;

the provision of apparatus of the above-described character using a semiconductor diode and voltage divider; and the provision of apparatus of the above-described character having an improved contact-open to contact-closed signal ratio.

These and other objectives of the present invention are efficiently met by providing an array of scanpoints comprising a semiconductor diode and a voltage divider, each scanpoint being coupled to a remote contact to be supervised. The scanpoint array is arranged in rows and columns; each row coupled to a driver and each column coupled to a column output means such as a pulse transformer. When the monitored relay contact is open the scanpoint diode is reverse biased and directs a pulsed interrogation signal from the row driver to the column output means. When the contact is closed the interrogation pulse is shunted to ground via the contact.

The foregoing as well as other objects, features and advantages of the present invention will become more apparent from the following detailed description taken in conjunction with the appended drawing.

BRIEF DESCRIPTION OF THE DRAWING

The single appended FIGURE is a schematic diagram of a remote contact sensing scanpoint matrix in accordance with the principles of the present invention.

DESCRIPTION OF PREFERRED EMBODIMENT

Turning now to the drawing, there is schematically illustrated a 2 × 2 scanpoint matrix including scanpoints 10$A_1$, 10$A_2$, 10$B_1$, and 10$B_2$ arranged in rows and columns. The scanpoints in each row are coupled in parallel to a row driver 12A and 12B and those in each column are coupled in parallel to a column output means 14$_1$ and 14$_2$. Each scanpoint is also coupled to a source of negative d.c. potential, $-V_1$. Each row driver 12, scanpoint 10 and column output means 14 are respectively identical in structure and operation.

The row drivers 12 include transistors 16 having their emitter leads coupled to the same negative d.c. potential, $-V_1$, as are the individual scanpoints 10. The collector leads of transistors 16 are coupled in parallel to the respective rows of scanpoints 10. The base and emitter of transistors 16 are coupled across the secondary windings of pulse transformers 18 in parallel with an isolating diode 20.

In operation, a particular row of scanpoints is selected for interrogation by means external to the scanpoint matrix. A control input pulse is applied across the input terminals 22 and 24 of the selected row driver 12 to the base of transistor 26 via resistor 28. Transistor 26 is normally biased in its non-conducting state by a negative d.c. potential, $-V_2$, coupled to its base via resistor 30. The positive going control input pulse switches transistor 26 to its conducting state and an input pulse of $+V_3$ d.c. potential is coupled from the collector to the primary winding of the pulse transformer 18 through resistor 19. This pulse saturates transistor 16 and a pulse of d.c. potential, $-V_1$, is applied in parallel to the scanpoints 10 of the selected row.

The pulse of $-V_1$ potential is applied via an input resistor 32 to the cathodes of the scanpoint diode 34 and column output diode 36. The anode of the scanpoint diode 34 is coupled via resistor 38 to the source of d.c. potential, $-V_1$, and via resistor 40 to ground. The contact 42 to be monitored is coupled by a twisted pair cable represented by looped leads 44 across resistor 40. Resistors 38 and 40 thus act as a voltage divider which provides a reverse bias voltage to the scanpoint diode 34 when the monitored contact 42 is open. Resistor 40 is included in the scanpoints 10 to reduce the reverse bias voltage, $-V_1$, to some relatively lower value which may be tolerated by scanpoint diode 34. It will be understood, however, that if it is permissible or desirable in a given application to use a diode 34 capable of taking the full reverse bias voltage, $-V_1$, then resistor 40 may be eliminated without deleterious effect upon the operation of the apparatus of the invention. Under the contact-open condition the input pulse passes through column output diode 36 and is coupled to the primary winding of the column output transformer 14 and a usable output pulse indicative of an open contact at the selected row and column is produced in the secondary winding. In the event that a contact 42 coupled to a particular scanpoint 10 in a selected row is closed, the input pulse is shunted to ground via the scanpoint diode 34 and resistor 40 and no output pulse is produced at the secondary of the column output transformer 14.

A resistor 52 is coupled across the primary winding of each column output transformer 14 for discharging the residual magnetization of the transformer winding after the occurrence of an output pulse. Since the column output transformers 14 are typically coupled to a common return bus (not shown), an isolating diode 54 is placed in the transformer output to eliminate undesired loading. The diode 54 also operates to eliminate any negative undershoot on the output pulses. Finally, resistor 56 is coupled across the secondary windings of each column output transformer 14 to match the impedance of the twisted pair output cable 50. It will thus be seen that the conductive state of remote relay contacts, switching transistors or the like may be easily supervised with an output pulse appearing on the secondary winding of the column output transformer whenever the contact or switch is open. In a matrix actually constructed by the Applicant using a $-V_1$ of $-48$ volts, $-V_2$ of $-5$ volts and $+V_3$ of 24 volts, a 5 volt output pulse amplitude was achieved at a repetition rate of 2 microseconds using 100 feet of twisted pair cable for the input drive pulse, the contact monitor leads and the column output transformer output leads as represented by loops 48, 44 and 50 respectively. This is achieved without using any active component in the individual scanpoints and with no requirement for amplifiers in the column outputs. The transformer coupling also provides both input and output isolation from the $-V_1$ potential. Finally, the scanpoint matrix of the present invention is economical of manufacture in that only two diodes and three resistors are required for each scanpoint and is electrically efficient in providing a very low battery current drain per scanpoint.

From the foregoing discussion it will be apparent that the Applicant has provided a new and improved scanpoint matrix for sensing the state of a plurality of signal lines. Since certain changes in the above described construction will occur to those skilled in the art without departure from the scope of this invention, it is intended that all matter contained herein or shown in the appended drawing shall be interpreted as illustrative and not in a limiting sense.

Having described what is new and novel and desired to secure by Letters Patent, what is claimed is:

1. An electronic scanpoint matrix for monitoring the states of a plurality of signal lines, each said line being provided with an electrical contact, said matrix comprising
   - a source of biasing potential;
   - an array of scanpoints arranged in electrical rows and columns, each said scanpoint being coupled across a corresponding signal line to be monitored, and including means coupled between said source and said scanpoint for rendering said scanpoint electrically conductive in response to said contact being closed, and electrically non-conductive in response to said contact being open;
   - means associated with each said row of scanpoints for selectively coupling an electrical input signal in parallel to each scanpoint in a row of said array;
   - output coupling means associated with each said column of scanpoints and coupled in parallel to each scanpoint in said column;
   - means included in each said scanpoint for coupling said input signal to said output coupling means when said scanpoint is electrically non-conductive on the application of said input signal thereto; and
   - means included in each said scanpoint for coupling said input signal to ground when said scanpoint is electrically conductive on the application of said input signal thereto.

2. Apparatus as recited in claim 1 wherein each said scanpoint comprises
   - a junction coupled to said selective input signal coupling means, a first electrical resistance coupled across said signal line and at one side thereof to ground, a scanpoint diode having the cathode thereof coupled to said junction and the anode thereof coupled to said source of biasing potential, one side of said signal line and the ungrounded side of said resistance, a column output diode having the cathode thereof coupled to said junction and the anode thereof coupled to said output coupling means, said biasing potential operative to reverse bias said scanpoint diode to an electrically non-conductive state in response to said contact being open such that said input signal is coupled through said column output diode, thereby indicating the open state of said electrical contact.

3. Apparatus as recited in claim 2 further including
   - a second resistance coupled between said source of biasing potential and the anode of said scanpoint diode, said first and second resistances comprising a voltage divider for providing a reverse bias voltage to said scanpoint diode in response to said contact being open.

4. Apparatus as recited in claim 1 wherein each said selective electrical input signal coupling means comprises
   - means adapted to receive pulsed input control signals,
   - a first transistor having the base thereof coupled in parallel to said input receiving means and to a source of negative d.c. potential, the emitter thereof coupled to ground, and the collector thereof coupled to a control pulse input coupling means;
   - a second transistor having the base thereof coupled to said control pulse input coupling means, the emitter thereof coupled in parallel to said control pulse input coupling means and to said source of biasing potential, and the collector thereof coupled in parallel to each said scanpoint in a row of said array.

5. Apparatus as recited in claim 4 wherein
   - said control pulse input coupling means comprises a pulse transformer having one side of the primary winding thereof at a positive d.c. potential and the other side of said primary winding coupled to the collector of said first transistor.

6. Apparatus as recited in claim 5 further including
   - an isolating diode having the cathode thereof coupled to the base of said second transistor and the anode thereof coupled to the emitter of said second transistor in parallel with the secondary winding of said pulse transformer.

7. Apparatus as recited in claim 1 wherein said output coupling means comprises a pulse transformer having the primary winding thereof coupled at one side in parallel to said junction of each scanpoint in said column and at the other side thereof to ground, and the secondary winding thereof providing a column output for said scanpoint matrix.

8. Apparatus as recited in claim 7 further including a resistance coupled in parallel with the primary winding of said pulse transformer and operative to dissipate residual magnetism of said transformer.

9. Apparatus as recited in claim 7 further including an isolating diode having the cathode thereof coupled to one side of the secondary winding of said pulse transformer.

10. Apparatus as recited in claim 7 further including a twisted pair cable coupled across the secondary winding of said pulse transformer, and an impedance matching resistance coupled in parallel with said twisted pair cable across said secondary winding.

* * * * *